United States Patent [19]

Gesswein et al.

[11] 3,915,707

[45] Oct. 28, 1975

[54] DIAZO RESIN COMPOSITION WITH PHOSPHOR PIGMENTS AND PROCESS FOR THE MANUFACTURE OF A SCREEN FOR CATHODE RAY TUBES

[75] Inventors: Eberhard Gesswein, Ulm-Wiblingen; Werner Moller, Ulm; Hans Ruckert, Naurod, all of Germany

[73] Assignees: Hoechst Aktiengesellschaft; Licentia Patent-Verwaltungs-GmbH, Germany

[22] Filed: Nov. 23, 1973

[21] Appl. No.: 418,266

[30] Foreign Application Priority Data

Nov. 25, 1972 Germany ............................ 2257920
Mar. 2, 1973 Germany ............................ 2310617

[52] U.S. Cl. ........................ 96/36.1; 96/75; 96/91 R; 96/115 R

[51] Int. Cl.[2] ........................ G03C 5/18; G03C 1/54

[58] Field of Search ...... 96/36.1, 75, 36.91 R, 91 N, 96/115 R

[56] References Cited

UNITED STATES PATENTS

| | | | |
|---|---|---|---|
| 2,840,470 | 6/1958 | Levine | 96/36.1 |
| 2,959,483 | 11/1960 | Kaplan | 96/36.1 X |
| 3,149,975 | 9/1964 | Notley | 96/36.1 UX |
| 3,317,319 | 5/1967 | Mayaud | 96/36.1 |
| 3,387,975 | 6/1968 | Tamura | 96/36.1 |
| 3,406,068 | 10/1968 | Law | 96/36 |
| 3,461,077 | 8/1969 | Kobayoshi et al. | 96/36.1 X |
| 3,574,129 | 4/1971 | Hammond et al. | 96/36.1 UX |
| 3,585,034 | 6/1971 | Levinos | 96/36.1 X |
| 3,598,629 | 10/1971 | Mellar et al. | 96/36.1 X |
| 3,679,419 | 7/1972 | Gillich | 96/75 |
| 3,849,392 | 11/1974 | Steppan | 96/75 |
| 3,867,147 | 2/1975 | Teuscher | 96/91 R |

FOREIGN PATENTS OR APPLICATIONS

| | | | |
|---|---|---|---|
| 2,041,395 | 2/1972 | Germany | 96/36.4 |

*Primary Examiner*—Charles L. Bowers, Jr.
*Attorney, Agent, or Firm*—James E. Bryan

[57] ABSTRACT

This invention relates to a light-sensitive copying composition for the manufacture of screens for cathode ray tubes, comprising a dispersion of a phosphor pigment in an aqueous solution of a hydrophilic cross-linkable binder and a sensitizer, the sensitizer being a condensation product of an aromatic diazonium compound containing recurrent units of the general types $A—N_2X$ and B, which are connected by methylene groups, said units $A—N_2X$ being derived from compounds of the general formula $(R_1—R_3)_pR_2—N_2X$ wherein X is the anion of an aliphatic monosulfonic acid with one to six carbon atoms, $p$ is an integer from 1 to 3, $R_1$ is a carbocyclic or heterocyclic aromatic group, having at least one condensable position, $R_2$ is an arylene group of the benzene or naphthalene series, $R_3$ is either a single bond or one of the following groups:

$—(CH_2)_q—NR_4—$
$—(CH_2)_q—NR_4—(CH_2)_r—NR_5—$
$—O—(CH_2)_r—NR_4—$
$—S—(CH_2)_r—NR_4—$
$—O—R_6—O—$
$—O—$
$—S—$
$—CO—NR_4—$
$—SO_2—NR_4—$ wherein $q$ is an integer from 0 to 5, $r$ is an integer from 2 to 5, $R_4$ is either hydrogen, or an alkyl group with one to five carbon atoms, or an aralkyl group with seven to 12 carbon atoms, or an aryl group with six to 12 carbon atoms, $R_5$ is hydrogen or an alkyl group with one to five carbon atoms, and $R_6$ is an arylene group with six to 12 carbon atoms and said units B being radicals, free of diazonium groups, of the following compounds: aromatic amines, phenols, thiophenols, phenol ethers, aromatic thioethers, aromatic hydrocarbons, aromatic heterocyclic compounds, or organic acid amides. The invention also includes a process for the manufacture of a screen for a cathode ray tube employing the novel light-sensitive composition.

11 Claims, No Drawings

DIAZO RESIN COMPOSITION WITH PHOSPHOR PIGMENTS AND PROCESS FOR THE MANUFACTURE OF A SCREEN FOR CATHODE RAY TUBES

The present invention relates to a process for the manufacture of a screen for a cathode ray tube, especially a color television picture tube, wherein a dispersion of a phosphor pigment is applied in a light-hardenable copying composition to the supporting surface for the screen, the dried copying composition is exposed to the negative of a scanning pattern, and the non-exposed areas of the layer are then washed away by means of a developer.

It is known that screens for color television tubes are manufactured by coating the support for the screen with three scanning patterns consisting of red-emitting, green-emitting and blue-emitting dots of luminescent substances which are arranged adjacent to each other in a particular arrangement and luminesce upon excitation by electron beams. These three dot patterns are applied one after the other by coating, exposure and development. In the past, suspensions of such phosphors in polyvinyl alcohol solutions normally were used for this purpose, which solutions had been sensitized to ultra-violet light by ammonium dichromate.

It was found that the use of ammonium dichromate as the sensitizer also had undesirable effects upon the suspensions of luminescent substances. Owing to their relatively poor stability, even after the addition of wetting agents and stabilizers, the known suspensions require a long period of grinding, which considerably reduces the brightness of the phosphors. Further, owing to the poor storage qualities of dichromate/polyvinyl alcohol layers in the dark, it is necessary for the ammonium dichromate to be added only shortly before the suspension is used. During the coating operation, air humidity and ambient temperature must be accurately and constantly maintained, because even slight deviations cause faulty exposures. Finally, the brilliance of the screen is reduced by chromate residues and by the chromium-III-compounds formed during exposure and retained in the hardened elements of the pattern.

This and other drawbacks of the known copying compositions are described in detail in German Offenlegungsschrift No. 1,772,118, for example. In this publication, it is particularly pointed out that the brilliance of the screen picture is impaired by the residual inorganic components present, besides the phosphor pigments, in the developed copying layer after the burning-in step. The solution proposed in this publication is to use photopolymerizable copying compositions containing a photoinitiator system of diazonium salts and ferric salts. In this manner, the proportion of inorganic substances within the layer can be substantially reduced below that of polyvinyl alcohol/dichromate layers. With this photoinitiator system, however, metal salts, i.e., the ferric salts, and frequently also the complex anions of diazonium salts, such as the zinc chloride double salts, are still contained in the layer. If the diazonium salts are not in the form of their metal complex salts, they have anions, such as tetrafluoborate and hexafluorosilicate, which under the conditions in which they are further processed, may attack the phosphors or the surface of the television screen. Further, the photopolymer system has the fundamental drawback that, due to the radical polymerization mechanism, it is sensitive to atmospheric oxygen, a fact which interferes with reciprocity.

Further, it is known from other technical fields to prepare light-hardenable copying compositions from hydrophilic binders and diazonium salts, especially diazonium salt condensates of relatively high molecular weights. German Offenlegungsschrift No. 2,041,395, e.g., has recently described the use of copying compositions consisting of hydrophilic polymers and certain diazonium salt mixed condensates in the form of salts of lower aliphatic sulfonic acids, for the preparation of screen printing stencils. The relatively high light-sensitivity, the good shelf-life, and the possibility to use water for development, are mentioned as advantages of these copying compositions.

It is the object of the present invention to provide a process and a copying composition for the manufacture of viewing screens for cathode ray tubes, which avoid the above described disadvantages of known copying compositions used for this purpose, i.e., which can be applied in purely aqueous solutions, do not leave any undesirable inorganic residues after burning-in, and do not cause the luminescent substances to be attacked.

The object of the present invention is a light-sensitive copying composition for the manufacture of screens for cathode ray tubes comprising a dispersion of a phosphor pigment in an aqueous solution of a hydrophilic cross-linkable binder and a sensitizer, the sensitizer being a condensation product of an aromatic diazonium compound containing recurrent units of the general types A—$N_2X$ and B, which are connected by methylene groups, the units A—$N_2X$ being derived from compounds of the general formula $(R_1—R_3)_p$-$R_2$—$N_2X$ and

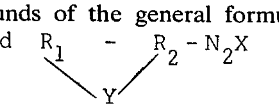

wherein

X is the anion of an aliphatic monosulfonic acid with one to six carbon atoms, $p$ is an integer from 1 to 3, $R_1$ is a carbocyclic or heterocyclic aromatic group having at least one condensable position, $R_2$ is an arylene group of the benzene or naphthalene series, $R_3$ is either a single bond or one of the following groups:

—$(CH_2)_q$—$NR_4$—
—$(CH_2)_q$—$NR_4$ —$(CH_2)_r$—$NR_5$—
—O—$(CH_2)_r$—$NR_4$—
—S—$(CH_2)_r$—$NR_4$—
—O—$R_6$—O—
—O—
—S—
—CO—$NR_4$—
—$SO_2$—$NR_4$— wherein $q$ is an integer from 0 to 5, $r$ is an integer from 2 to 5, $R_4$ is either hydrogen, or an alkyl group with one to five carbon atoms, or an aralkyl group with seven to 12 carbon atoms, or an aryl group with six to 12 carbon atoms, $R_5$ is hydrogen or an alkyl group with one to five carbon atoms, and $R_6$ is an arylene group with six to 12 carbon atoms, and the units B being radicals, free of diazonium groups, of the following compounds: aromatic amines, phenols, thiophenols, phenol ethers, aromatic thioethers, aromatic hydrocarbons, aromatic heterocyclic compounds, or organic acid amides.

The diazonium salt condensates used according to the invention are known per se and are described, e.g., in German Offenlegungsschrift No. 2,041,395 which refers to U.S. application Ser. No. 826,297, now abandoned, which has been refiled as a continuation application, U.S. application Ser. No. 410,324, now U.S. Pat. No. 3,867,147; and U.S. application Ser. No. 826,296, now abandoned, which has been refiled as a continuation application, U.S. application Ser. No. 224,324, now U.S. Pat. No. 3,849,392, for a description of the diazonium salt condensation according to this invention as well as their preparation. Among these condensation products, the salts of methane sulfonic acid are preferred because they possess a particularly favorable water solubility and yield copying layers which are capable of being burned-in in vacuo under comparatively gentle conditions, without leaving any residues.

The preparation of the diazo polycondensates to be used according to the invention is described in detail in copending application Ser. Nos. 826,297 and 826,296, now U.S. Pat. Nos. 3,867,147, and 3,849,392, respectively.

Those of the condensation products are preferred whose units A—$N_2X$ are derived from a diphenylamine-4-diazonium salt which may be substituted, especially from a diphenylamine-4-diazonium salt which is substituted in the 3- position by an alkoxy group with one to three carbon atoms, preferably by a methoxy group.

Phenol ethers, thiophenol ethers, aromatic hydrocarbons, and non-basic heterocyclic compounds, especially substituted and unsubstituted diphenyl ethers, diphenyl sulfides, diphenyl methanes, and diphenyls are preferred as compounds from which the units B are obtained.

The units A—$N_2X$ and B are present in the condensation products in a molar ratio ranging preferably from 1 : 0.5 to 1 : 2.

Suitable hydrophilic binders are, e.g.: cellulose ethers, such as methyl cellulose, gelatin, or polyvinyl pyrrolidone, and, above all, polyvinyl alcohol.

Normally, the copying compositions contain about 1 to 30 percent, preferably from 2 to 20 percent, by weight of binder, calculated on the weight of the phosphor pigment. When the preferred phosphor pigments are used with polyvinyl alcohol as the binder, best results are obtained with quantities ranging between about 3 and 10 percent. The proportion of sensitizer is normally within the range of about 10 to 50 percent, preferably 15 to 35 percent by weight, based on the weight of the binder present.

The present invention further provides a process for the manufacture of a screen for a cathode ray tube, especially a color television viewing screen wherein a light-sensitive copying composition comprising a dispersion of a phosphor pigment in an aqueous solution of a hydrophilic cross-linkable binder and a sensitizer is applied to the supporting surface for the screen, the copying layer thus produced is exposed under a scanning pattern, and the unexposed areas are washed away with an aqueous liquid, the sensitizer used being a condensation product of an aromatic diazo compound of the above described constitution.

According to one embodiment of the invention process, exposure of the copying layer takes place at temperatures between 25° and 50°C, preferably between 35° and 45°C.

For the manufacture of a color television viewing screen, this process is repeatedly applied, using phosphors corresponding to another of the primary colors in each case, so that finally a viewing screen is produced which contains red-emitting, green-emitting, and blue-emitting luminescent substances arranged side by side in a particular pattern.

The phosphors used are substances which are known per se and which are conventionally employed for the manufacture of color television picture tubes. Suitable red-emitting phosphors are, e.g., luminescent yttrium or gadolinium compounds activated by a rare earth, preferably Europium, such as $Y_2O_3$:Eu or $Y_2O_2S$—Eu. As blue-emitting and green-emitting phosphors, those based on sulfides are preferred, such as: (Zn, Cd)S:Cu, ZnS:Ag, and (Zn, Cd)S:Ag.

The copying compositions according to the invention are distinguished in that they are particularly compatible with the phosphors normally used. surprisingly, they can be stabilized not only at weakly acid pH values, but also at neutral or weakly alkaline pH values approaching those of the normal luminescent dispersions, which are thus particularly favorable for these luminescent substances.

During the final evacuation and burning-in of the picture tube, the binders and sensitizers used according to the invention leave practically no residues, so that viewing screens distinguished by an excellent luminosity and brilliance are produced.

The copying composition according to the invention has the particular advantage that the binder/phosphor suspensions are less sensitive to outside influences and more stable at elevated temperatures. The coated screens may be stored for a relatively long period of time under varying climatic conditions without affecting the exposure time or the developability. This is particularly important in case an interruption should occur in the manufacturing process. Further, it has proved to be of advantage that the ready-made suspension may be stored for up to several weeks at room temperature. Moreover, it is not necessary to work with a sodium lamp (yellow light), but light containing no UV rays will be sufficient. The exposure time is short and depends surprisingly little on the concentration of the sensitizer, so that an expensive dosing device for adjustment of the concentration can be dispensed with. It was found that it is sufficient to check the concentration once a day under a spectroscope. An essential feature of the invention is the good compatibility of the copying composition and of the diazonium salt condensate contained therein with the phosphors normally used for color television picture tubes, such as (Zn, Cd)S:Cu, ZnS:Ag, (Zn, Cd)S:Ag, $Y_2O_3$:Eu and $Y_2O_2S$:Eu.

The present invention will now be described more in detail by reference to the following examples of preferred embodiments of the invention:

EXAMPLE 1

200 g of the luminescent substance (Zn, Cd)S:Cu (green-emitting) with an average particle size of 7$\mu$m and a grain-size distribution from 2 to 20$\mu$m are ground for about 2 hours with 200 ml of an approximately 3% by weight aqueous polyvinyl alcohol solution, to which some octyl alcohol has been added as an anti-foaming agent, in a 1-liter ball mill containing 300 ml of ceramic balls of a diameter of 2 to 3 mm. The dispersion is then filtered and diluted by adding another 400 ml of approximately 3% by weight aqueous polyvinyl alcohol. The resulting dispersion is then sensitized by adding a solution, in 50 ml of water, of 5 g of the condensation product of 1 mole of 3-methoxy-diphenylamine—4-diazonium sulfate and 1 mole of 4,4'-bis-methoxy-methyl-diphenylether, prepared at 40°C in 86% by weight phosphoric acid and separated in the form of the methane sulfonate. The viscosity of the sensitized phosphor/binder dispersion at 23°C is approximately 16 cps, its density is about 1.20 g/cm$^3$, and its pH value is about 5.3.

The adhesion of this dispersion to glass is very good, although no wetting agent was added in this example. After storage for eight weeks in the absence of ultra-violet light, the coated and dried suspension did not lose any of its sensitivity to ultra-violet light. Even when the sensitized layer was exposed for more than 1 day to yellow light, no cross-linking or pre-exposure phenomena could be observed. After exposure to UV light, the layer was still found to be capable of long storage. An aqueous development carried out several days after exposure to UV light yielded results which were no less advantageous than those of a development conducted immediately after exposure.

EXAMPLE 2

300 g of the luminescent substance ZnS:Ag (blue-emitting), 300 ml of an about 3% by weight aqueous polyvinyl alcohol solution, and about 50 ml of a 10 per cent by weight aqueous solution of a condensation product produced from the same components as in Example 1, but at a molar ratio of 2 : 1 and isolated in the form of the methane sulfonate, are ground for about 5 minutes in a 1-liter ball mill containing 300 ml of grinding balls. The resulting dispersion is then mixed with 3 drops of octyl alcohol and ground again for about 80 to 90 minutes. The coating dispersion is then adjusted to the desired values by adding about 220 ml of water and 570 ml of an approximately 3% by weight aqueous polyvinyl alcohol solution.

Equal results are obtained when the above mentioned condensation product is replaced by the product obtained from 1 mole of the same diazo compound and 1.5 moles of 1,3-dihydroxy-methyl-4,6-diisopropyl-benzene, separated either in the form of the methane sulfonate or as the propane-2-sulfonate.

EXAMPLE 3

300 g of the phosphor $Y_2O_2S$-Eu (red-emitting), 300 ml of an about 5 percent by weight aqueous solution of polyvinyl alcohol, and 30 ml of an about 10 percent by weight aqueous solution of the condensation product of 1 mole of 2,5,4'-triethoxy-diphenyl-4-diazonium sulfate and 1 mole of 4,4'-bis-methoxymethyl-diphenylether (separated in the form of the methane sulfonate) are ground for about 5 minutes in a 1-liter ball mill containing 300 ml of grinding balls, and the resulting mixture is then mixed with 3 drops of octyl alcohol and again ground for about 130 to 150 minutes. Before application of the copying composition to the glass surface of the viewing screen, it is adjusted by adding 150 ml of water and 50 ml of a 5% by weight aqueous polyvinyl alcohol solution.

EXAMPLE 4

3,750 g of the phosphor (Zn, Cd)S:Cu (green-emitting), 1.8 liters of water, a small quantity of a wetting agent, and 2 to 3 ml of octyl alcohol are mixed with each other and then ground for about 105 minutes in a 15-liter ball mill containing 5 liters of grinding balls. Then about 1.4 liters of an 8% by weight polyvinyl alcohol solution, 1.4 liters of water, and 350 ml of a 10% by weight aqueous solution of the condensation product used in Example 2 are added to the suspension, and the mixture is either ground again for about 1 hour, or filled into a bottle and homogenized for about 8 to 10 hours in a roller-type shaking apparatus.

The desired copying composition is then obtained by adding as much water and polyvinyl alcohol as is necessary to produce the desired viscosity and density of the dispersion.

It will be obvious to those skilled in the art that many modifications may be made within the scope of the present invention without departing from the spirit thereof, and the invention includes all such modifications.

What is claimed is:

1. A process for the manufacture of a viewing screen for an aperture mask-type color television picture tube which comprises applying, as the luminescent substance, a dispersion of a phosphor pigment derived from a yttrium or gadolinium compound and activated by a rare earth, in an aqueous solution of a hydrophilic cross-linkable binder and a sensitizer to a supporting surface for the viewing screen, exposing the copying layer thus produced under a scanning pattern, and washing away the unexposed areas with an aqueous liquid, the sensitizer being a condensation product of an aromatic diazonium compound containing recurrent units of the general types $A—N_2X$ and B which are connected by methylene groups, in which $A—N_2X$ is a radical of a compound of one of the general formulae $(R_1-R_3-)_pR_2-N_2X$ and 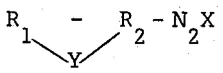

wherein

X is the anion of an aliphatic monosulfonic acid with one to six carbon atoms, $R_1$ is an arylene group of the benzene or naphthalene series $R_2$ is a phenylene group $R_3$ is a single bond or one of the groups —$(CH_2)_q$—$NR_4$—

—O—$(CH_2)_r$—$NR_4$—

—S—$(CH_2)_r$—$NR_4$—

—S—$CH_2$—CO—$NR_4$—

—O—$R_6$—O—

—O—

—S— or

—CO—$NR_4$— the left-hand free valence of the specified groups is attached to $R_1$ and the right-hand free valence is attached to $R_2$ wherein $q$ is a number from 0 to 5

$r$ is a number from 2 to 5

$R_4$ is selected from the group consisting of hydrogen, alkyl with one to five carbon atoms, aralkyl with seven to 12 carbon atoms, and aryl with six to 12 carbon atoms, $R_6$ is an arylene group having six to 12 carbon atoms, —Y— is one of the groups —NH—, and —O—

*p* is a number from 1 to 3, and

B is a radical of a compound selected from the group consisting of aromatic amines, phenols, thiophenols, phenol ethers, aromatic thioethers, aromatic heterocyclic compounds, aromatic hydrocarbons and organic acid amides, in which the aromatic nuclei are unsubstituted or substituted by at least one substituent activating condensation and selected from the group consisting of $—NR_7R_8$, $—N(R_8)_2$, $—OR_7$, $—OR_8$, $—R_8$ and $—SR_8$, wherein $R_7$ is —H, —CO—alkyl, —CO—aryl, $—SO_2—$alkyl, $—SO_2—$aryl, $—CONH_2$ or $—CSNH_2$, and $R_8$ is —H, —alkyl, —aryl or —aralkyl, the alkyl groups having one to 10, the aryl groups six to 20, and the aralkyl groups seven to 20 carbon atoms, which diazonium compound contains, on the average, about 0.01 to 50 B units per unit of $A—N_2X$.

2. A process according to claim 1 in which exposure of the copying layer takes place at temperatures between 25°C and 50°C.

3. A light-sensitive copying composition for the manufacture of a viewing screen for an aperture mask-type color television picture tube containing, as the luminescent substance, a dispersion of a phosphor pigment derived from a yttrium or gadolinium compound and activated by a rare earth, in an aqueous solution of a hydrophilic cross-linkable binder and a sensitizer, the sensitizer being a condensation product of an aromatic diazonium compound containing recurrent units of the general types $A—N_2X$ and B, which are connected by methylene groups, in which $A—N_2X$ is a radical of a compound of one of the general formulae $(R_1-R_3-)_pR_2-N_2X$ and 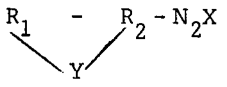

wherein

X is the anion of an aliphatic monosulfonic acid with one to six carbon atoms, $R_1$ is an arylene group of the benzene or naphthalene series $R_2$ is a phenylene group $R_3$ is a single bond or one of the groups $—(CH_2)_q—NR_4—$ $—O—(CH_2)_r—NR_4—$ $—S—(CH_2)_r—NR_4—$ $—S—CH_2—CO—NR_4—$ $—O—R_6—O—$

—O—

—S— or $—CO—NR_4—$ the left-hand free valence of the specified groups is attached to $R_1$ and the right-hand free valence is attached to $R_2$ wherein

*q* is a number from 0 to 5

*r* is a number from 2 to 5

$R_4$ is selected from the group consisting of hydrogen, alkyl with one to five carbon atoms, aralkyl with seven to 12 carbon atoms, and aryl with six to 12 carbon atoms, $R_6$ is an arylene group having six to 12 carbon atoms, —Y— is one of the groups —NH—, and —O—

*p* is a number from 1 to 3, and

B is a radical of a compound selected from the group consisting of aromatic amines, phenols, thiophenols, phenol ethers, aromatic thioethers, aromatic heterocyclic compounds, aromatic hydrocarbons and organic acid amides, in which the aromatic nuclei are unsubstituted or substituted by at least one substituent activating condensation and selected from the group consisting of $—NR_7R_8$, $—N(R_8)_2$, $—OR_7$, $—OR_8$, $—R_8$ and $—SR_8$, wherein $R_7$ is —H, —CO—alkyl, —CO—aryl, $—SO_2—$alkyl, $—SO_2—$aryl, $—CONH_2$, or $—CSNH_2$, and $R_8$ is —H, —alkyl, —aryl or —aralkyl, the alkyl groups having one to 10, the aryl groups six to 20, and the aralkyl grooups seven to 20 carbon atoms; which diazonium compound contains, on the average, about 0.01 to 50 B units per unit of $A—N_2X$.

4. A copying composition according to claim 3 in which B is the radical of a diphenyl ether, a diphenyl sulfide, a diphenyl methane, or of diphenyl.

5. A copying composition according to claim 3 in which X is the anion of methane sulfonic acid.

6. A copying composition according to claim 3 in which the units of type $A—N_2X$ are derived from a diphenylamine diazonium salt.

7. A copying composition according to claim 3 in which the units of type $A—N_2X$ and the units of type B are present in a molar ratio ranging from 1 : 0.5 to 1 : 2.

8. A copying composition according to claim 3 in which the binder is selected from the group consisting of polyvinyl alcohol, methyl cellulose, gelatin, and polyvinyl pyrrolidone.

9. A copying composition according to claim 3 including wetting agents, stabilizers, and anti-foaming agents.

10. A copying composition according to claim 3 in which the rare earth is Europium.

11. A copying composition according to claim 3 containing a phosphor based on a sulfide as the green-emitting or blue-emitting luminescent substance.

* * * * *